United States Patent
Vikberg et al.

(10) Patent No.: US 8,428,597 B2
(45) Date of Patent: Apr. 23, 2013

(54) RAN NODE AND METHOD THEREOF

(75) Inventors: Jari Vikberg, Järna (SE); Karl-Peter Ranke, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/264,092

(22) PCT Filed: Sep. 9, 2011

(86) PCT No.: PCT/SE2011/051099
§ 371 (c)(1),
(2), (4) Date: Oct. 12, 2011

(65) Prior Publication Data

US 2013/0045742 A1    Feb. 21, 2013

Related U.S. Application Data

(60) Provisional application No. 61/523,708, filed on Aug. 15, 2011.

(51) Int. Cl.
*H04W 36/00* (2009.01)

(52) U.S. Cl.
USPC ........ 455/436; 455/412.2; 455/524; 370/331; 370/350

(58) Field of Classification Search .......... 455/436, 455/412.2, 524; 370/331, 350
See application file for complete search history.

(56) References Cited

U.S. PATENT DOCUMENTS 5,278,892 A  * 1/1994 Bolliger et al. ............... 455/442
7,869,808 B2 * 1/2011 Kojima ......................... 455/437
(Continued)

FOREIGN PATENT DOCUMENTS

| EP | 2160049 A1 | 3/2010 |
| WO | 2007130325 A2 | 11/2007 |
| WO | 2007136339 A2 | 11/2007 |

OTHER PUBLICATIONS

Nokia, et al., "Real Time SRNS Relocation for PS domain", 3GPP TSG-RAN Working Group 3 meeting #16, Oct. 12, 2000, Sophia Antipolis Cedex, France, R3-002595.

(Continued)

*Primary Examiner* — Jinsong Hu
*Assistant Examiner* — Qun Shen
(74) *Attorney, Agent, or Firm* — Coats & Bennett, P.L.L.C.

(57) ABSTRACT

The present invention relates to a method of a serving Radio Access Network (RAN) node for facilitating communication between a communication terminal and a core network in view of a handover of the communication terminal from said serving RAN node. The method comprises receiving a first message from the communication terminal, the message comprising a first message sequence number. The method also comprises producing a sequence number synchronization indicator (SNSI) arranged to indicate to a second RAN node to adjust a message sequence number of any future message from the communication terminal before forwarding said future message to the core network, such that the message sequence number of said future message is synchronized with a corresponding expected message sequence number of the core network. The method further comprises sending an update message to the second RAN node, wherein the update message comprises the SNSI.

11 Claims, 3 Drawing Sheets

U.S. PATENT DOCUMENTS

| | | | |
|---|---|---|---|
| 2003/0100291 A1* | 5/2003 | Krishnarajah et al. | 455/410 |
| 2007/0291695 A1* | 12/2007 | Sammour et al. | 370/331 |
| 2008/0002594 A1* | 1/2008 | Forsberg et al. | 370/252 |
| 2009/0238116 A1* | 9/2009 | Chaponniere et al. | 370/328 |
| 2010/0027465 A1* | 2/2010 | Ylitalo et al. | 370/328 |
| 2010/0080194 A1* | 4/2010 | Kawasaki et al. | 370/332 |
| 2010/0313024 A1* | 12/2010 | Weniger et al. | 713/170 |
| 2012/0099525 A1* | 4/2012 | Maheshwari | 370/328 |
| 2012/0189016 A1* | 7/2012 | Bakker et al. | 370/401 |
| 2012/0202491 A1* | 8/2012 | Fox et al. | 455/435.1 |

OTHER PUBLICATIONS

Teliasonera, "Sequence number handling during redirection in MOCN sharing scenario", 3GPP TSG-CN1 Meeting #35 Tdoc N1-041645, Aug. 31, 2004, pp. 1-6, Sophia Antipolis Cedex, France.

* cited by examiner

RAN NODE AND METHOD THEREOF

TECHNICAL FIELD

The invention relates to a serving Radio Access Network, RAN, node as well as to a method of such a serving RAN node for facilitating communication between a communication terminal and a core network in view of a handover of the communication terminal from said serving RAN node.

BACKGROUND

Femtocell base stations are known in different communication standards. The 3GPP standard with specification number 3GPP TS 25.467 v 10.2.0 for instance describes the UTRAN architecture for femtocell base station for 3G Home Node B (HNB).

Specifically, the 3GPP TS 25.467 standard specification describes a UE registration function as "The UE Registration Function for HNB provides means for the HNB to convey UE identification data to the HNB-GW in order to perform access control or membership verification for the UE in the HNB GW. The UE Registration also informs the HNB-GW of the specific HNB where the UE is located."

According to the standard, UE registration is performed by the HNB and the HNB registers a specific UE with the HNB-GW. The registration is triggered when the UE attempts to access the HNB via an initial NAS message over the Uu interface (e.g., Locating Updating (LU) Request or a CM Service Request initial NAS message) and there is no context in the HNB allocated for that UE.

Chapter 5.1.2 of the same standard describes the case where a HNB registers a UE in the HNB GW when either the UE or the HNB, or both, do not belong to a CSG. In this case, the standard describes the option that the HNB may in certain cases fetch the permanent identity of the subscriber with a NAS Identity Request procedure before registering the subscriber in the HNB GW. The step of fetching the permanent identity of the subscriber consists of a NAS Identity Request message sent by the HNB, and a NAS Identity Response message sent by the UE as a reply, containing the subscriber identity (IMSI).

A problem with the existing standard as described above is that the HNB uses a NAS message to fetch the identity of the subscriber. However, NAS messages are defined to be exchanged between the CN and the UE, and they are standardized in 3GPP TS 24.008. The NAS messages contain a 'sequence number', N(SD), that allows the CN to detect duplicated NAS messages sent by the UE. NAS messages may be duplicated by the Data Link layer in some cases, for example at channel change before the last layer 2 frame has been acknowledged by the peer. The NAS sequence number mechanism is described in 3GPP TS 24.007, chapter 11.2.3.2.3 and subchapters. The first NAS message is sent by the UE with sequence number '0'. The CN will receive this first NAS message with sequence number '0' in the RANAP Initial UE message. However, when the HNB fetches the subscriber identity with a NAS Identity Request message, then the UE will step the sequence number and reply with a NAS Identity Response with sequence number '1'. This means that the CN will discard any further NAS message sent by the UE to the CN, since the UE will send the next NAS message to the CN with the sequence number '2', but the CN expects the next NAS message to have the sequence number '1' according to TS 24.007. Thus, e.g. the Location Update or the CM Service Request in the CN will fail in certain cases, for example if the CN tries to authenticate the subscriber with a NAS Authentication Request, since the CN will discard the Authentication Response from the UE.

WO 2007/136339 discloses a method and radio network controller (RNC) in a radio access network (RAN) for controlling access to cellular telecommunication system. Upon receiving an access request from a given user equipment (UE) through a given radio base station (RBS), the RNC retrieves authorization information from an access control database within the RAN. The authorization information indicates whether the given UE is authorized to access the system through the given RBS. The RNC alternatively grants access or denies access to the UE based on the retrieved authorization information. The RBS is particularly useful for controlling access through small cells with limited capacity.

According to WO 2007/136339 the RAN is injecting NAS messages in the communication between the UE and the CN, whereby there is the possibility that the send sequence number, N(SD), may get out of synchronization between the UE and the CN. This may be a problem if the CN is performing any checks on the received N(SD). Thus, a procedure is performed to synchronize the N(SD). If the CN is performing checks on the N(SD), the Femto-RNC can be configured to perform N(SD)-mapping during the location updating procedure when the identification procedure was triggered from the Femto-RNC. The N(SD)-mapping procedure may include the steps:

a) The initial LOCATION UPDATING REQUEST message from the UE with N(SD)=0 is forwarded to the CN.

b) The N(SD) for all uplink NAS-messages is decreased by one, also taking into account the maximum value of N(SD) depending on the indicated core network release.

SUMMARY

It is an objective of the present invention to alleviate a problem with the prior art discussed above.

According to an aspect of the present invention, there is provided a method of a serving Radio Access Network (RAN) node for facilitating communication between a communication terminal and a core network in view/case of a handover of the communication terminal from said serving RAN node. The method comprises receiving a first message from the communication terminal, the message comprising a first message sequence number. The method also comprises producing a sequence number synchronization indicator (SNSI) arranged to indicate to a second RAN node to adjust a message sequence number of any future message from the communication terminal before forwarding said future message to the core network, such that the message sequence number of said future message is synchronized with a corresponding expected message sequence number of the core network. The method further comprises sending an update message to the second RAN node, wherein the update message comprises the SNSI.

According to another aspect of the present invention, there is provided a method of a serving RAN node, such as a femtocell base station, for facilitating communication between a communication terminal, such as a mobile communication terminal, and a core network. The method comprises the serving RAN node sending a message to another RAN node. The message comprises a sequence number synchronization indicator, SNSI, indicating to said other RAN node to adjust a NAS message sequence number of a NAS message from the communication terminal before forwarding the NAS message to the core network, such that the NAS message sequence number of the NAS message is synchronized with a corresponding NAS message sequence number of the core network. The serving RAN node may e.g. be a Home Node B and the other RAN node may e.g. be another Home Node B or a Home Node B Gateway.

According to another aspect of the present invention, there is provided a use of an update indicator for adjusting a non-access stratum, NAS, message sequence number of a NAS message from a communication terminal to be synchronized with a corresponding expected NAS message sequence number of a core network to which the communication terminal is associated.

According to another aspect of the present invention, there is provided a use of a communication message, for synchronizing a NAS message sequence number of a NAS message from a communication terminal, such as a User Equipment, to be synchronized with a corresponding NAS message sequence number of a core network to which the communication terminal is associated. The communication message may e.g. be a message between CN and RAN, such as including a Source RNC to Target RNC Transparent Container IE or a Source BSS to Target BSS Transparent Container IE, comprising a sequence number synchronization indicator, SNSI.

According to another aspect of the present invention, there is provided an update indicator comprising a sequence number synchronization indicator, SNSI, the update indicator being adapted to indicate to a Radio Access Network, RAN, node to adjust a non-access stratum, NAS, message sequence number of a NAS message from a communication terminal to be synchronized with a corresponding expected NAS message sequence number of a core network to which the communication terminal is associated.

According to another aspect of the present invention, there is provided a communication message, such as a communication message between the RAN and the CN e.g. including a Source RNC to Target RNC Transparent Container IE or a Source BSS to Target BSS Transparent Container IE, comprising a sequence number synchronization indicator, SNSI. The message may be adapted to indicate to a RAN node, such as a Home Node B or a Home Node B Gateway, to adjust a NAS message sequence number of a NAS message from a communication terminal, such as a User Equipment, to be synchronized with a corresponding NAS message sequence number of a core network. The message may also be adapted to be sent by a femtocell base station, such as by a Home Node B or a Home Node B Gateway.

According to another aspect of the present invention, there is provided a serving Radio Access Network (RAN) node. The RAN node is adapted to send an update message to a second RAN node. The update message comprises a sequence number synchronization indicator (SNSI) arranged to indicate to the second RAN node to adjust a non-access stratum (NAS) message sequence number of any future NAS message from a communication terminal such that the future NAS message sequence number is synchronized with a corresponding expected NAS message sequence number of a core network to which the communication terminal is associated.

According to another aspect of the present invention, there is provided a serving Radio Access Network (RAN) node. The RAN node comprises a receiver configured with circuitry to receive NAS messages from a communication terminal, each of the NAS messages comprising a NAS message sequence number. The RAN node also comprises a sequence number update module configured with circuitry to produce a sequence number synchronization indicator (SNSI) arranged to indicating to a second RAN node to adjust a non-access stratum (NAS) message sequence number of any future NAS message from a communication terminal such that the future NAS message sequence number is synchronized with a corresponding expected NAS message sequence number of a core network to which the communication terminal is associated if a received NAS message, having a first sequence number, will not be forwarded to the core network before a received NAS message, having a second sequence number which is consecutive to the first sequence number, will be forwarded to the core network. The RAN node further comprises a transmitter configured with circuitry to perform sending of an update message to the second RAN node, the update message comprising the SNSI, as well as to forward at least some of the received NAS messages to the core network.

According to another aspect of the present invention, there is provided a femtocell base station. The femtocell base station is adapted to send a message to a RAN node, such as a Home Node B or a Home Node B Gateway. The message comprises a sequence number synchronization indicator, SNSI, indicating to the RAN node to adjust a NAS message sequence number of a NAS message from a communication terminal, such as a User Equipment, to be synchronized with a corresponding NAS message sequence number of a core network.

According to another aspect of the present invention, there is provided a communication system comprising a communication terminal, a core network, and a serving RAN node according to any one of the above aspects of the present invention.

According to another aspect of the present invention, there is provided a wireless communication system comprising a mobile communication terminal, a femtocell base station and a core network. The femtocell base station is adapted to send a message to a RAN node, such as a Home Node B or a Home Node B Gateway. The message comprises a sequence number synchronization indicator, SNSI, indicating to the RAN node to adjust a NAS message sequence number of a NAS message from the communication terminal, to be synchronized with a corresponding NAS message sequence number of the core network.

Discussions above and below relating to any one of the aspects of the invention are also, in applicable parts, relevant to any of the other aspects of the present invention.

As mentioned above, there is a potential problem with unsynchronized message sequence numbers, such as NAS message sequence numbers N(SD), between the communication terminal, such as a user equipment (UE), and a core network (CN) of a communication network. It is conceivable to allow a serving RAN node, such as a femtocell, e.g. a Home Node B (HNB) or a HNB Gateway (HNB-GW) responsible for the unsynchonization to synchronize the sequence number of any messages sent from the communication terminal after the occurrence of the unsynchonization before forwarding them to the CN. However, this will not help if there is a handover from the serving RAN node during communication, e.g. NAS messaging, between the communication terminal and the CN. This is in accordance with the present invention solved by the serving RAN node informing a second RAN node of the need to update the sequence number to be synchronized with the expected sequence number of the CN. The second RAN node may be the target RAN node of the handover, or a RAN node positioned between the target RAN node and the CN such that messages between the target RAN node and the CN passes via said second RAN node, i.e. the second RAN node may be higher in the hierarchy than the target RAN node but be associated with said target RAN node. The second RAN node may be part of the same radio access technology (RAT) as the serving RAN node and/or the target RAN node, or of another RAT. Thus, by means of the present invention, communication between the communication terminal and the CN is facilitated during and/or after handover from the serving RAN node to a target RAN node in case of, or in view of, such a handover of the communication terminal.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

Figure 1:
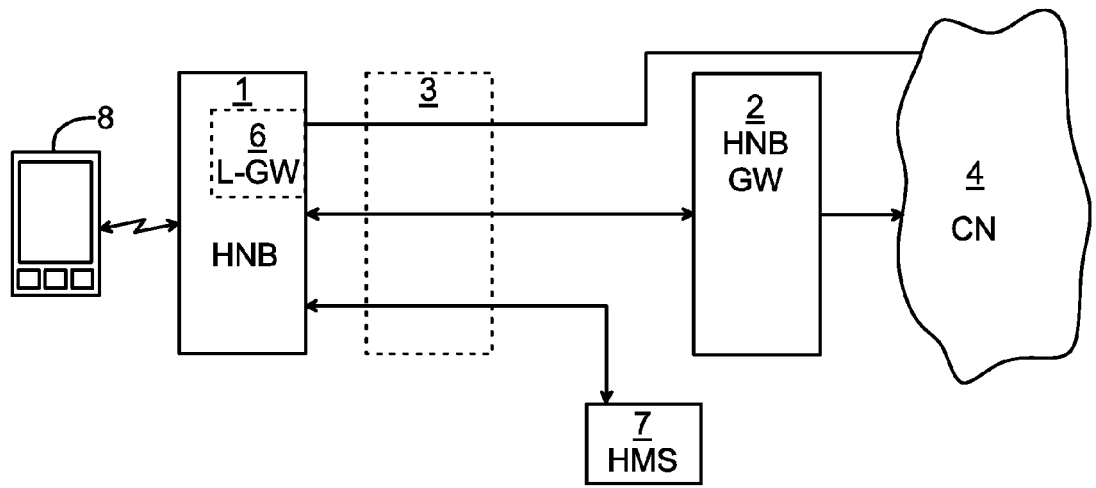
FIG. 1 is a schematic diagram illustrating a UE HNB access network reference model.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

| Abbreviations: | |
|---|---|
| UE: | User Equipment |
| HNB: | Home Node B |
| HNB-GW: | Home Node B Gateway |
| HMS: | HNB Management System |
| MSC: | Mobile Services Switching Centre |
| L-GW: | Local Gateway |
| SeGW: | Security Gateway |
| RAN: | Radio Access Network |
| RAT: | Radio Access Technology |
| CN: | Core Network |
| RNC: | Radio Network Controller |
| BSC: | Base Station Controller |
| BSS: | Base Station Subsystem |
| RNS: | Radio Network Subsystem |
| CSG: | Closed Subscriber Group |
| NAS: | Non-Access Stratum |
| IMSI: | International Mobile Subscriber Identity |
| RANAP: | Radio Access Network Application Part |
| RUA: | RANAP User Adaption |
| RRC: | Radio Resource Control |
| W-CDMA: | Wideband Code Division Multiple Access |
| LU: | Location Updating |
| 3GPP: | 3rd Generation Partnership Project |
| LTE: | Long Term Evolution |
| GSM: | Global System for Mobile Communications |
| UTRAN: | Universal Terrestrial Radio Access Network |
| UTRA: | UMTS Terrestrial Radio Access |
| DSL: | Digital Subscriber Line |
| IE: | Information Element |
| SNSI: | Sequence Number Synchronization Indicator |

The mobile communication network described herein may comply with the UTRA standard of 3GPP and that is commonly referred to as W-CDMA or any other applicable standard such as LTE, GSM, etc. Hereinafter, references are on occasion made to messages according to W-CDMA for completeness sake, but it is to be noted that this does not restrict the embodiments, which can be applied to any suitable standard.

The discussion herein is exemplified by UEs and HNBs of the 3GPP standard for UTRA and that is commonly referred to as W-CDMA. However, this should only be regarded as illustrating examples of the present invention. The present invention may also be relevant to other communication terminals and/or RAN nodes, such as home radio base station working according to other types of radio access technologies of which GSM, CDMA 2000 and LTE are examples.

The discussion herein is mainly directed to wireless communication. However, the present invention may also be relevant to wired communication.

The term "femtocell base station" and HNB are to be interpreted as a base station device being customer premise equipment and allowing access to a mobile communication network for mobile communication terminals within a small cell, typically located within a home or small business. The femtocell base station is connected to the mobile communication network via an IP connection, such as over DSL (Digital Subscriber Line), a cable TV network or a Metropolitan Area Network.

The serving RAN node may be any RAN node, e.g. a Node B or a femtocell such as a HNB. The present invention may be particularly useful if the serving RAN node is a femtocell since, as discussed above and below, problems with unsynchronized message sequence numbers may typically occur when a femtocell is used.

The second RAN node may be any RAN node. The second RAN node may e.g. be the target RAN node of the handover, e.g. a HNB or Node B, or a RAN node, e.g. an HNB-GW, RNC or BSC, positioned between the target RAN node and the CN such that messages between the target RAN node and the CN passes via said second RAN node, i.e. the second RAN node may be higher in the hierarchy than the target RAN node but be associated with said target RAN node. The second RAN node may be part of the same radio access technology (RAT) as the serving RAN node and/or the target RAN node, or of another RAT.

The communication terminal may be any communication terminal able to be associated/communicate with a CN via a RAN node. The communication terminal may e.g. be a mobile phone or a portable computer.

That the message sequence numbers of the communication terminal and the CN, respectively, correspond to each other, implies that the message sequence number of the CN is in respect of/for that specific communication terminal and that the respective sequence numbers are for the same type of messages, e.g. NAS messages.

The method of the present invention may further comprise the serving RAN node sending a request message to the communication terminal and, in response to the request message, receiving a second message from said communication terminal, prior to sending the update message to the second RAN node, the second message comprising a second message sequence number which is consecutive to the first message sequence number. By additional messaging between the serving RAN node and the communication terminal, there is a greater risk of the message sequence number getting out of sync with the expected message sequence number of the CN. This may be especially so if the RAN node sends a message, such as the request, on its own, i.e. not forwarding a message from the CN. If, for instance, the first message is of a type that is forwarded to the CN, then the CN may start its counter for the expected sequence number based on this first message. If the second message received by the serving RAN node is of a type intended for the RAN node and not forwarded to the CN, the CN will not increase its expected sequence number in view of said second received message, whereby it will be out of sync with the sequence number of the communication terminal for any further messages of the communication session from the communication terminal to the CN.

The SNSI may be arranged to indicate to the second RAN node to decrement the message sequence number of the future message from the communication terminal by a specified number of sequence steps. If the expected sequence number of the CN is out of sync with the corresponding sequence number of the communication terminal, this is likely by the sequence number of the communication terminal having been incremented further than the expected sequence number of the CN, due to message(s) sent to the serving RAN node and not forwarded to the CN. The SNSI may thus conveniently induce the second RAN node to decrement the sequence number of any further messages of the communication session before forwarding them to the CN, such that the decremented sequence number is in sync with, i.e. is the same as, the sequence number expected by the CN. The number of steps with which the sequence number should be decremented may depend on the number of messages sent from the communication terminal to the serving RAN node and not forwarded to the CN.

The received first message may be a non-access stratum (NAS) message, and the expected message sequence number of the core network and the corresponding message sequence number of said future message are NAS message sequence numbers. A specific situation where message sequence numbers may be used, and where thus problems with sequence numbers being out of sync between the communication terminal and the CN, may be NAS message signaling. The present invention may thus conveniently be implemented for NAS message signaling.

The SNSI may be comprised in an update indicator, which in its turn may be comprised in the update message. It may be convenient to include the SNSI in an already existing message or information element of the communication standard, thus reducing the need to amend the standard. The update indicator may e.g. be a Source RNC to Target RNC Transparent Container Information Element or a Source BSS to Target BSS Transparent Container Information Element, comprising the sequence number synchronization indicator (SNSI). These IEs can for example be included in the RANAP Relocation Request message.

The method may also be applied for the case when a further handover is performed from a first target RAN node to a second target RAN node. In this case the first target RAN node is acting in a similar way as the Serving RAN node described above when it comes to forwarding of the SNSI indicator to the second target RAN node. Then the second target RAN node ensures that the sequence numbers are aligned before the messages are forwarded to the CN. In addition, the SNSI may be forwarded to any target RAN node in any consecutive handovers.

The standard specification with number 3GPP TS 25.467 v 10.2.0 describes the UTRAN architecture for a femtocell base station for 3G HNB. The overall architecture is shown in FIG. 1. A communication terminal 8 is in wireless communication with the HNB 1. The HNB 1 is in wired or wireless communication with the CN 4, via the HNB-GW 2 or an optional L-GW 6, and with the HMS 7 via the SeGW 3.

The HNB 1 offers the Uu Interface to the UE 8 (e.g. a mobile communication terminal). Furthermore, the HNB 1 provides RAN connectivity using the Iuh interface, supports RNC like functions and supports HNB registration and UE registration over Iuh.

The SeGW 3 terminates secure tunneling for TR-069 (HNB Operation and Maintenance) as well as Iuh. Moreover, the SeGW 3 provides authentication of the HNB 1 and provides the HNB 1 with access to the HMS 7 and HNB-GW 2.

The HNB-GW 2 terminates the Iuh interface from the HNB 1 and appears as an RNC to the existing CN 4 using existing Iu interface. This means that the HNB Gateway 2 may be connected to for example an MSC, SGSN (Serving GPRS, General Packet Radio Service, Support Node) or GGSN (Gateway GPRS Support Node) in the CN 4. Moreover, the HNB-GW 2 supports HNB registration and UE registration functions over the Iuh interface.

An optional L-GW 6 may be present only when the HNB 1 supports Local IP (Internet Protocol) Access (LIPA) functionality. When present, it may be co-located with the HNB 1 in the 3GPP Rel-10 specification.

The HMS 7 can be based on TR-069 family of standards.

Figure 2:
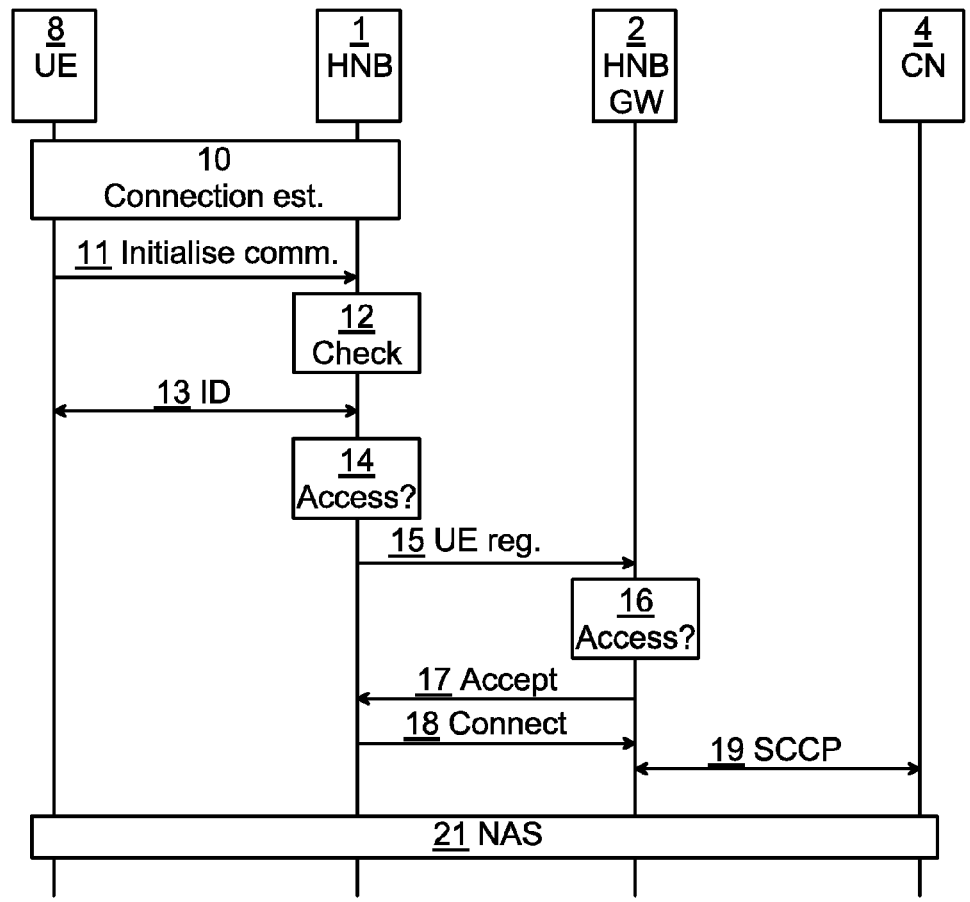
FIG. 2 is a sequence diagram illustrating UE Registration according to 3GPP TS 25.467.

FIG. 2 is a sequence diagram illustrating a UE Registration that may be performed in the system of FIG. 1. This is performed when the UE 8 registers with the HNB 1. Initially, the actual connection between the UE 8 and the HNB 1 is established 10.

The UE 8 then initializes communication 11, e.g. by sending a message in the form of an RRC Initial Direct Transfer message (e.g. a location update request, etc.)

The HNB 1 then checks 12 UE compatible standard release, UE capabilities etc.

Sometimes the permanent identity of the subscription using the UE 8 is required in order to check access. This is provided 13 through a femtocell base station message from the HNB 1 to the UE 8 and a corresponding terminal message to the HNB 1, e.g. including an IMSI as an identifier. This is implemented using NAS messages, whereby the UE 8 increments a sequence number N(SD) and includes this sequence number in the terminal message.

The HNB 1 then optionally performs 14 an access control or membership verification using the IMSI as the identity of the subscriber using the UE 8.

If the access control is successful, the HNB 1 sends a UE registration message 15 to the HNB GW 2. The UE registration message 15 can for example include the subscriber identity, UE compatible standard release, UE capabilities, etc.

The HNB GW 2 then performs 16 another access control or membership verification.

If all the access controls are clear, the HNB GW 2 sends 17 a UE registration accept message, including context ID, etc. to the HNB 1.

The HNB 1 then sends 18 a RANAP User Adaption (RUA) connect message (including the RANAP initial UE message that includes the first NAS message, e.g. Location Updating Request or CM Service Request, received from the UE) to the HNB GW 2, which sets up SCCP communication 19 with the CN 4. In the SCCP communication 19, the HNB GW 2 may send a SCCP CR message comprising the RANAP initial UE message from step 11 with N(SD)=1, and the CN 4 may respond with an SCCP CC message to the HNB GW 2. After that, further NAS communication 21 may occur between the CN 4 and the UE 8, via the HNB 1 and the HNB GW 2. As explained above, this procedure has issues, since a NAS sequence number was incremented by the UE 8 in the identity retrieval 13 between the HNB 1 and the UE 8. This creates a discrepancy in sequence number between the UE 8 and the CN 4, which may result in messages needing to be resent, with decreased performance as a result. However, a solution to this issue in accordance with an embodiment of the present invention is illustrated in the sequence diagram of FIG. 3.

FIG. 2 illustrates the UE registration for non-CSG UEs or non-CSG HNBs according to 3GPP TS 25.467.

The specification 3GPP TS 25.467 describes UE registration function as following (in section 5.1): "The UE Registration Function for HNB provides means for the HNB to convey UE identification data to the HNB-GW in order to perform access control or membership verification for the UE in the HNB GW. The UE Registration also informs the HNB-GW of the specific HNB where the UE is located."

UE registration may be performed by the HNB 1 and the HNB 1 registers a specific UE 8 with the HNB-GW 2. The registration is triggered when the UE 8 attempts to access the HNB 1 via an initial NAS message 11 over the Uu interface (e.g., LU Request or CM Service Request) and there is no context in the HNB 1 allocated for that UE 8.

The chapter 5.1.2 of that standard describes the case that a HNB 1 registers a UE 8 in the HNB GW 2 when either UE 8 or HNB 1 or both do not belong to a CSG.

In that case the standard describes the option that the HNB 1 may in certain cases fetch the identity of the subscriber before registering the subscriber in the HNB GW 2 with a NAS Identity Request procedure 13. This step 13 of FIG. 2 consists of a NAS Identity Request message sent by the HNB 1, and a NAS Identity Response message sent by the UE 8 as a reply, containing the subscriber identity (IMSI).

A problem with the existing solution is that in step 13 of the registration procedure shown in FIG. 2, the HNB 1 uses a NAS message to fetch the identity of the subscriber. However, NAS messages are defined to be exchanged between the CN 4 and the UE 8, and they are standardized in 3GPP TS 24.008.

The NAS messages contain a 'sequence number', N(SD), that allows the Core Network 8 to detect duplicated NAS messages sent by the UE 8. NAS messages may be duplicated by the Data Link layer in some cases, for example at channel change before the last layer 2 frame has been acknowledged by the peer. The NAS sequence number mechanism is described in 3GPP TS 24.007, chapter 11.2.3.2.3 and subchapters: The first NAS message at or after RRC (Radio Resource Control) connection establishment is sent by the UE with sequence number '0' (e.g. in step 11 in FIG. 2, the Location Updating (LU) Request is sent with sequence number '0'). The CN 4 will receive this first NAS message with sequence number '0' in the RANAP Initial UE message (step 19 in FIG. 2).

However, when the HNB 1 fetches the subscriber identity with a NAS Identity Request message, then the UE 8 will step the sequence number and reply with a NAS Identity Response with sequence number T.

This means that the CN 4 will discard any further NAS message sent by the UE 8 to the CN 4, since the UE 8 will send the next NAS message to the CN 4 with the sequence number '2', but the CN 4 expects the next NAS message to have the sequence number '1' according to TS 24.007. This means that the Location Update in the CN 4 would fail in certain cases, for example if the CN 4 tries to authenticate the subscriber 8 with a NAS Authentication Request, since the CN 4 would discard the Authentication Response from the UE 8.

Note: In this specific case the sequence number is a 2-bit number as it is standardized in TS 24.007 for networks following 3GPP R99 or later. A Core network 4 with UTRAN access has to follow 3GPP R99 or later release.

Figure 3:
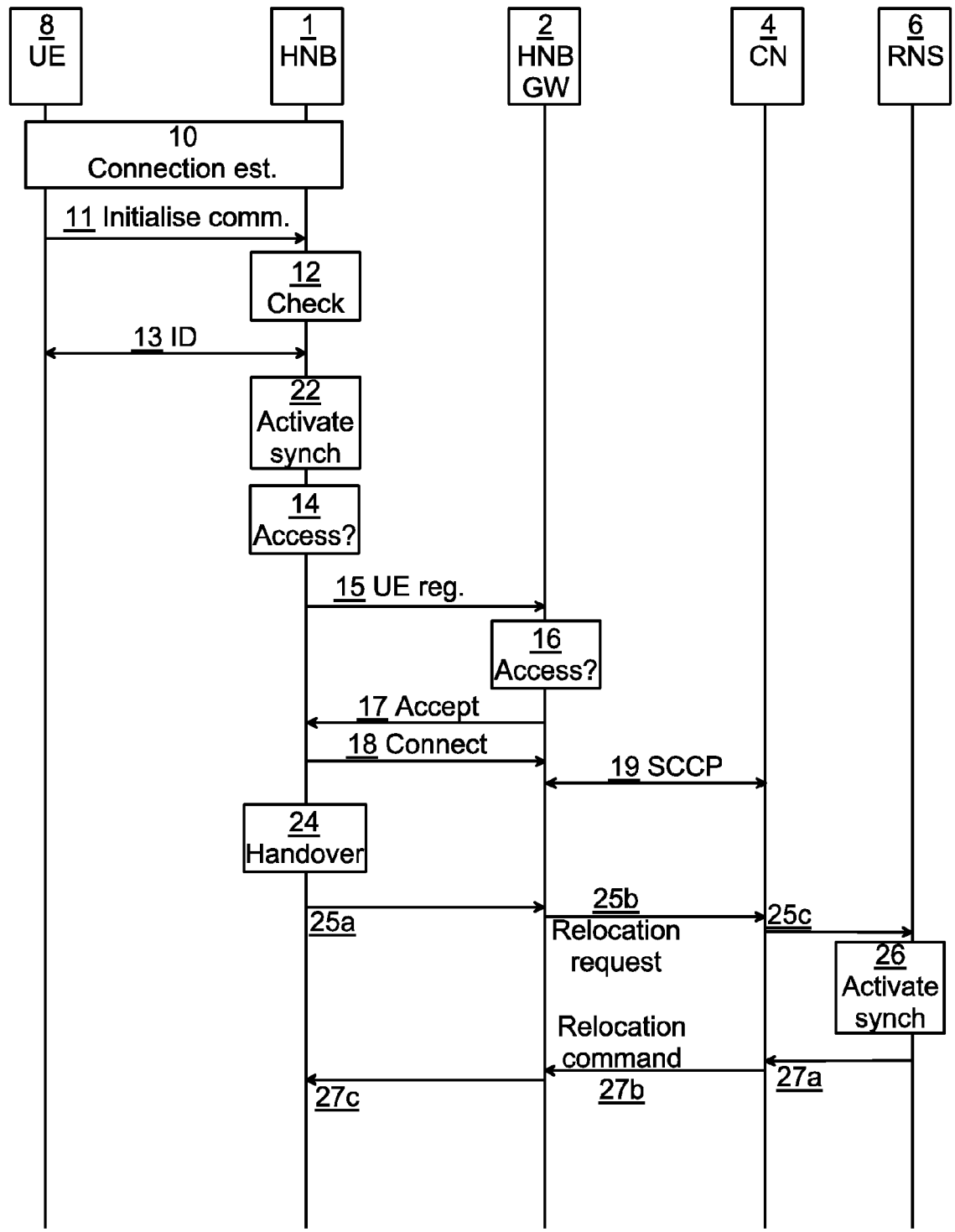
FIG. 3 is a sequence diagram illustrating an embodiment of a method for UE Registration in accordance with the present invention.

FIG. 3 is a sequence diagram which illustrates a solution, in accordance with an embodiment of the present invention, to the problem with non-corresponding sequence numbers in a communication between the UE 8 and the CN 4 by a RAN node, such as the HNB 1 or HNB GW 2, performing a "sequence number synchronization" operation. The solution may then be that the HNB 1 (or the HNB GW 2) which has triggered the additional NAS Identity Request procedure 13 will also modify all uplink sequence numbers to the correct values expected by the CN 4. Sequence number synchronization by the femtocell base station is shown in WO 2007/136339, referred to in the background section above. However, the method therein described does not account for a handover of the communication terminal during the NAS signaling.

As previously discussed with reference to FIG. 2, connection is first established 10 between the UE 8 and the HNB 1, an initial UE communication 11 (e.g. LU Request or CM Service Request) is sent from the UE 8 to the HNB 1 and the check 12 is performed by the HNB 1 followed by the identity request communication 13 (NAS signaling). In accordance with the embodiment illustrated in FIG. 3, the HNB 1, which was responsible for the additional NAS signaling 13, activates 22 a sync function or module. The sync function is arranged to decrease the N(SD) of any further NAS messages from the UE 8 by 1 (if one NAS message was sent by the UE 8 during the identification signaling 13) before forwarding the NAS messages towards the CN 4. The further steps 14-19 may then proceed as in FIG. 2. In the NAS procedure 21, the messages from the UE 8 to the CN 4 will have the sequence numbers expected by the CN 4 regardless of the extra NAS signaling 13 since the HNB 1 has decreased the N(SD) of the messages accordingly.

As an example (cf. FIG. 3), the following may happen:

1 The UE 8 initially sends 11 the NAS Location Updating Request message with sequence number '0'.

2 The RAN node, such as the HNB 1, triggers the Identity Request procedure 13, and the UE 8 sends the NAS Identity Response message to the network, i.e. the HNB 1, with sequence number '1'.

3 After this, the RAN node 1 forwards 19 the NAS Location Updating Request message to the MSC, which is part of the CN 4, and the sequence number '0' is accepted.

4 Then the MSC triggers authentication 21 of the subscription using UE 8 with NAS Authentication Request message and the UE 8 replies with the NAS Authentication Response with the sequence number '2' (as this is the 3rd NAS message from the UE in the uplink).

5 Now the "sequence number synchronization" 22 takes place as the RAN node 1 replaces sequence number '2' in the NAS Authentication Response from the UE 8 with sequence number '1' before forwarding the NAS message to the MSC.

This synchronization may continues for the whole duration of the signaling connection 21 in which the additional NAS Identity Request procedure 13 was triggered by the RAN node 1.

With continued reference to FIG. 3, the basic principle of sequence number synchronization as exemplified above is illustrated. In comparison with the method illustrated in FIG. 2, a new step 22 for activating uplink sequence number synchronization has been introduced. This allows the continued NAS procedures (cf. NAS procedure 21 in FIG. 2) in which the "uplink sequence number synchronization" 22 function modifies the sequence number in the uplink NAS messages sent by the UE 8, by in this example decreasing the received sequence number by 1. The sequence number received by the RAN node 1 may of course be decreased or increased as needed to achieve synchronization, if e.g. more than one NAS message has been sent to the RAN node 1 without forwarding to the CN 4. The method is not limited to decreasing the sequence number by 1.

The method described above for sequence number synchronization works well when the UE 8 stays with the same RAN node 1 for the whole duration of the signaling connection. However, if the UE 8 connects to different RAN nodes, such as HNBs, during the same signaling connection, a target RAN node, to which the UE 8 connects which is not the serving RAN node 1 that triggered the additional NAS Identity Request procedure 13, may not be aware that sequence number synchronization is needed. The sequence number synchronization solution described above may thus work only in the case when the UE 8 stays with the same RAN node 1 for the whole duration of the signaling connection. In one case this could be just the Location Updating procedure, but in other cases the UE 8 may indicate a Follow On-procedure as part of the signaling connection establishment (for example by setting the Follow-On Request bit (FOR) in the Location updating type IE in the Location updating request message). In this case the UE 8 may use the same signaling connection for another transaction like CS call establishment. The latter case increases the possibility of a handover of the UE from one RAN node 1 to another taking place.

If the UE is handed over to any other cell or RAN node then the new serving RAN node may not be aware of the additional NAS Identity Request procedure triggered by the previous RAN node. Examples of these types of handovers are e.g.:
1. Handover from HNB to RNC/NB (e.g. from 3G Femto to 3G Macro/Micro/Pico)
2. Handover from HNB to another HNB (i.e. from 3G Femto to 3G Femto)
3. Handover from HNB to BSC/BTS (i.e. from 3G Femto to GSM)

Since the new serving RAN node is not aware of the need to perform "sequence number synchronization", the MSC will reject all NAS signaling via the new serving RAN node, in accordance with the previous discussion.

This potential problem with sequence number synchronization when there is a handover may however be solved or at least alleviated in accordance with the present invention. In accordance with an aspect of the present invention, the old serving RAN Node (i.e. the source node, the node from which a handover of the UE 8 is made) informs the new serving RAN Node (i.e. the target node, the node to which a handover of the UE 8 is made) about the need to continue performing sequence number synchronization as described above and in FIG. 3. This method may conveniently be performed using RAN Transparent containers during the handover preparation phase. The RAN nodes (source/serving and target nodes) may be nodes at the same hierarchical level, e.g. two HNBs (handover example 2 above), but they may also be at different hierarchical levels, e.g. in accordance with the handover examples 1 or 3 above.

When a handover is performed, e.g. between two different HNBs, both HNBs, and thus the UE 8, may still be within the same cell of a node, or function or the like, of a higher level in the hierarchy (e.g. HNB GW 2, Node B (e.g. 3G Macro/Micro/Pico) or such). In that case, it may be sufficient for the source node, e.g. HNB 1, to inform the higher level node or function, e.g. HNB GW 2, about the need to continue performing sequence number synchronization. This higher level node or function may then itself perform the sequence number synchronization or instruct its relevant lower node(s) or function(s) to perform the sequence number synchronization. Informing the higher level node or function may be done if needed, e.g. if the source node is performing a handover, or preemptively. Thus, according to a specific example, a serving HNB 1 informs its HNB GW 2 that the HNB GW 2 needs to perform the sequence number synchronization for a specific signaling connection. In this case, mobility between HNBs will be allowed and enabled as long as the same HNB GW 2 is used for the UE 8 and its signaling connection.

Regardless of to which node or function the serving node sends the information about the need to continue performing sequence number synchronization, the information may be sent in a new or existing information element, e.g. included in the RAN transparent container IE as a new indicator. This information element or indicator is here called "sequence number synchronization indicator (SNSI)". The SNSI may e.g. indicate any of the following information:
  Continue sequence number synchronization, decrement by 1 (this is the normal case when a single NAS procedure, like the NAS Identity Request procedure, has been triggered towards the UE from the RAN).
  Continue sequence number synchronization, decrement by x (this would be the case when multiple NAS procedures, like NAS Identity Request procedure, have been triggered towards the UE from the RAN).

The RAN container where the SNSI may be included may be defined depending on which handover case is taking place:
  If the target RAT is WCDMA/UTRAN, then the SNSI may be included in the "Source RNC to Target RNC Transparent Container IE" defined in 3GPP TS 25.413.
  If the target RAT is GSM/GERAN, then the SNSI may be included in the "Source BSS to Target BSS Transparent Container IE" as defined in 3GPP TS 48.018.

An example of CN Hard Handover (SRN Relocation) from HNB to NB is also shown in FIG. 3 from step 24 and onward. A decision is made 24 to perform a CN hard handover (SRNS relocation) towards a macro cell served by a target RNS 6. Thus, a relocation request procedure 25 is initiated from the HNB 1 (serving RAN node) to the target RNS 6 (serving the target RAN node for the UE 8 handover). The relocation request 25 may be subdivided into three signaling steps:
1. 25a—RUA Direct Transfer (RANAP Relocation Required comprising a Source RNC to Target RNC Transparent Container IE with the SNSI), from the serving RAN node, e.g. the HNB 1, to the HNB GW 2,
2. 25b—RANAP Relocation Required (Source RNC to Target RNC Transparent Container IE with the SNSI), from the HNB GW 2 to the CN 4 (e.g. to a 3G MSC of the CN 4), and 3.25c—RANAP Relocation Request (Source RNC to Target RNC Transparent Container IE with the SNSI), from the CN 4 (e.g. from the 3G MSC of the CN 4) to the target RNS 6.

The target RNS 6 may then in response to the update indicator included in the relocation request activate 26 a sync function or module similar to step 22 discussed above. The target RNS 6 may then, also in response to the relocation request 25, issue a relocation command 27 back to the serving RAN node 1. In analogy with the relocation request 25, also the relocation command 27 may be subdivided into three signaling steps:

1.27a—RANAP Relocation Request ACK, from the target RNS 6 to the CN 4 (e.g. to a 3G MSC of the CN 4),
2.27b—RANAP Relocation Command, from the CN 4 (e.g. from the 3G MSC of the CN 4) to the HNB GW 2, and
3.27c—RUA Direct Transfer (RANAP Relocation Command), from the HNB GW 2 to the serving RAN node, e.g. the HNB 1.

FIG. 3 thus shows how the "Source RNC to Target RNC Transparent Container IE" in these RANAP messages also contains the SNSI. In 26 the Target RNS 6 uses the received SNSI to activate uplink sequence number synchronization for this signaling connection. Indicating the SNSI from the HNB 1 to HNB GW 2 may be part of the RANAP User Adaption (RUA) signaling in the Iuh-interface between the HNB 1 and the HNB GW 2. Examples of messages are for example the RUA CONNECT and DIRECT TRANSFER messages.

Another alternative, than inducing the target RNS 6 in the way shown in FIG. 3, is that the HNB 1 informs the HNB GW 2 that the HNB GW 2 needs to perform the "sequence number synchronization" for a specific signaling connection. In this latter case, mobility between HNBs would be allowed and enabled as long as the same HNB GW 2 is used for the UE 8 and its signaling connection.

The present invention has the advantage that it may not require new implementation in the mobile terminal or in the CN, since it can use existing NAS messages.

Another advantage of the present invention is that it may not be necessary with any extra signaling towards the UE 8, the communication terminal.

Another advantage is that the solution may be independent of the UE 8 staying associated with the same RAN node 1 for the whole duration of the signaling connection. The sequence number synchronization of the present invention thus allows handover of the UE 8 between different RAN nodes during the signaling, e.g. handover from the HNB 1 to a Node B, to another HNB, or to a Base Transceiver Station (BTS).

Figure 4:
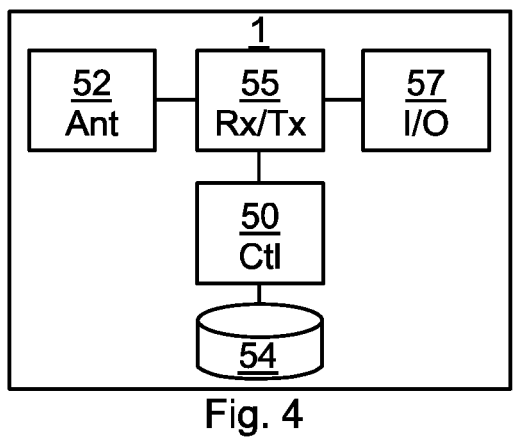
FIG. 4 is a schematic diagram of an HNB.

FIG. 4 is a schematic diagram showing some components of a HNB 1 such as any one of the HNBs discussed herein. A controller 50 is provided using any suitable central processing unit (CPU), microcontroller, digital signal processor (DSP), application specific integrated circuit etc., capable of executing software instructions stored in a computer program product 54, e.g. in the form of a memory. The computer program product 54 can be a memory or any combination of read and write memory (RAM) and read only memory (ROM). The memory also comprises persistent storage, which, for example, can be any single one or combination of magnetic memory, optical memory, solid state memory or even remotely mounted memory.

The HNB 1 also comprises an I/O interface 57 for communicating with the HNB GW using the security gateway over the Iuh interface, and optionally with other HNBs over the Iurh interface.

The I/O interface 57 implements a communication interface unit and is responsible for the implementation of internet protocol (IP) interfaces. The controller, or control unit, 50 implements higher protocol layers and other control, such as Iuh, Iurh and Uu interfaces.

The HNB 1 also comprises one or more transceivers 55 and a corresponding number of antennas 52 for radio communication with mobile communication terminals over the Uu interface.

The HNB 1 may be a separate device or it can be combined with a DSL modem, Ethernet switch and/or WiFi access point.

Figure 5:
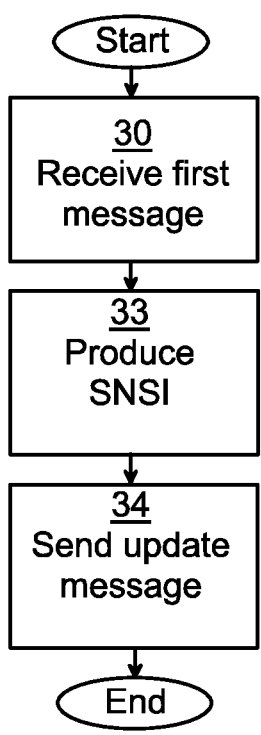
FIG. 5 is a schematic flow chart of an embodiment of a method of the present invention.

FIG. 5 is a schematic flow chart illustrating an embodiment of a method of the present invention. The method is performed in the HNB 1, or other serving RAN node such as a femtocell base station, for facilitating communication between the communication terminal 8 and the CN 4.

A first message from the communication terminal 8 is received 30 by the serving RAN node 1. Said first message comprises a first message sequence number. As discussed above, the first message may e.g. be a NAS message comprising an LU Request comprising the N(SD)=0.

The RAN node 1 may produce 33 the SNSI as discussed above. This SNSI is arranged to indicate to a second RAN node to adjust a message sequence number of a future message from the communication terminal 8 before forwarding the future message to the CN 4. This production 33 may be induced by the receiving 30 of the first message, or it may additionally be induced by any indication that a handover of the communication terminal 8 may be performed to the second RAN node or to a RAN node associated with the second RAN node.

An update message is sent 34 to the second RAN node. The update message comprises the SNSI.

By this method, the second RAN node may thus be informed that, and how, it should update/adjust the sequence number of a future message, such as a NAS message from the communication terminal 1 to the CN 4 in case of a handover of said communication terminal 8 from the serving/source RAN node 1 to a target RAN node, which may be the second RAN node or another RAN node associated with said second RAN node such that a message which sequence number should be adjusted sent from the communication terminal 8 after handover is forwarded to the CN 4 via the second RAN node.

Figure 6:
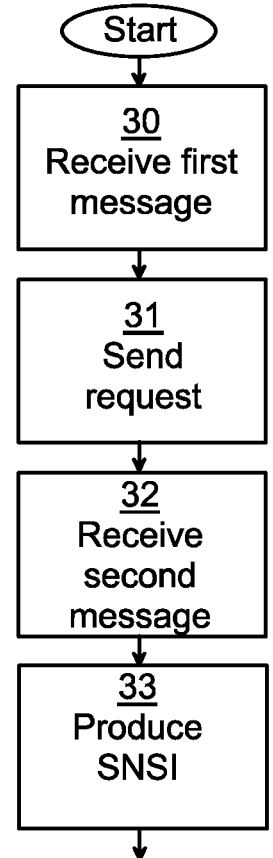
FIG. 6 is a schematic flow chart of another embodiment of a method of the present invention.

FIG. 6 is a schematic flow chart illustrating another embodiment of a method of the present invention. The embodiment may be a more specific version of the embodiment of FIG. 5.

A serving HNB 1 receives 30 a first NAS message from the UE 8. The NAS message comprises an LU Request with a NAS sequence number, e.g. N(SD)=0. The HNB 1 sends 31 an identity request to the UE 8, and in response receives 32 a second NAS message from the UE 8. The second NAS message has a NAS sequence number which is consecutive to the sequence number of the first NAS message, in this example N(SD)=1.

The HNB 1 than proceeds to produce 33 the SNSI and sending 34 the update message to the second RAN node in the same way as described in FIG. 5 above.

While the embodiments described above relate to resynchronising sequence numbers of messages due to communication between the HNB and the UE during registration, the same procedure is applicable to other occasions when the HNB would need to communicate with the UE without the knowledge of the CN, where the sequence number is incremented for messages from the UE.

Figure 7:
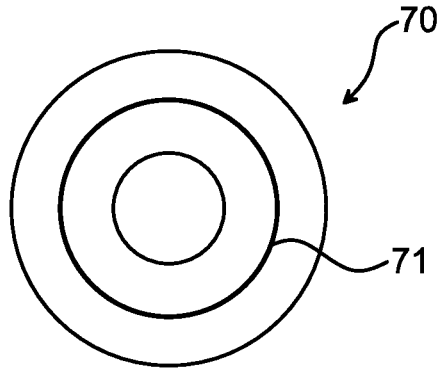
FIG. 7 illustrates an embodiment of a computer program product comprising computer readable means in accordance with the present invention.

FIG. 7 shows one example of a computer program product 70 comprising computer readable means. On this computer readable means a computer program 71 can be stored, which computer program 71 can cause a controller to execute a method according to embodiments of the present invention described herein. In this example, the computer program product is an optical disc, such as a CD (compact disc) or a DVD (digital versatile disc) or a Blu-Ray disc. The computer program product could additionally or alternatively be embodied as a memory of a device, such as memory 54 of the HNB 1. While the computer program 71 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a serving Radio Access Network (RAN) node for facilitating communication between a communication terminal and a core network in view of a handover of the communication terminal from said serving RAN node, the method comprising:

receiving a first message from the communication terminal, the message comprising a first message sequence number;

producing a sequence number synchronization indicator (SNSI) arranged to indicate to a second RAN node to adjust a message sequence number of any future message from the communication terminal before forwarding said future message to the core network, such that the message sequence number of said future message is synchronized with a corresponding expected message sequence number of the core network; and sending an update message comprising the SNSI to the second RAN node.

2. The method of claim 1, further comprising sending a request message to the communication terminal, and in response to the request message, receiving a second message from said communication terminal prior to sending the update message to the second RAN node, the second message comprising a second message sequence number consecutive to the first message sequence number.

3. The method of claim 1, wherein the SNSI is arranged to indicate to the second RAN node to decrement the message sequence number of the future message from the communication terminal by a specified number of sequence steps.

4. The method of claim 1, wherein the received first message comprises a non-access stratum (NAS) message, and wherein the expected message sequence number of the core network and the corresponding message sequence number of said future message comprises NAS message sequence numbers.

5. The method of claim 1, wherein the method complies with a 3GPP standard.

6. The method of claim 1, wherein the serving RAN node comprises a femtocell base station.

7. The method of claim 1, wherein the serving RAN node comprises a Home Node B (HNB).

8. A serving Radio Access Network (RAN) node, wherein the RAN node is adapted to send an update message to a second RAN node, the update message comprising a sequence number synchronization indicator (SNSI) indicating to the second RAN node to adjust a non-access stratum (NAS) message sequence number of any future NAS message from a communication terminal such that the future NAS message sequence number is synchronized with a corresponding expected NAS message sequence number of a core network to which the communication terminal is associated.

9. The serving RAN node of claim 8, wherein the serving RAN node comprises a femtocell base station.

10. The serving RAN node of claim 8, comprising:

a receiver configured to receive NAS messages from the communication terminal, each of the received NAS messages comprising an NAS message sequence number;

a transmitter configured to send the update message to the second RAN node and to forward at least some of the received NAS messages to the core network; and a sequence number update module configured to produce the SNSI if a received NAS message, having a first sequence number, will not be forwarded to the core network before a received NAS message, having a second sequence number which is consecutive to the first sequence number, will be forwarded to the core network.

11. A communication system comprising:

a core network;

a communication terminal associated with the core network; and a serving RAN node adapted to send an update message to a second RAN node, the update message comprising a sequence number synchronization indicator (SNSI) indicating to the second RAN node to adjust a non-access stratum (NAS) message sequence number of any future NAS message from the communication terminal such that the future NAS message sequence number is synchronized with a corresponding expected NAS message sequence number of the core network to which the communication terminal is associated.

* * * * *

UNITED STATES PATENT AND TRADEMARK OFFICE
CERTIFICATE OF CORRECTION

PATENT NO. : 8,428,597 B2  Page 1 of 1
APPLICATION NO. : 13/264092
DATED : April 23, 2013
INVENTOR(S) : Vikberg et al.

It is certified that error appears in the above-identified patent and that said Letters Patent is hereby corrected as shown below:

In the Specification

In Column 10, Line 4, delete "T." and insert -- '1'. --, therefor.

Signed and Sealed this
Thirty-first Day of December, 2013

Margaret A. Focarino
*Commissioner for Patents of the United States Patent and Trademark Office*